United States Patent [19]

Ulrich et al.

[11] Patent Number: 5,039,112
[45] Date of Patent: Aug. 13, 1991

[54] MULTI-LAYER LIP SEAL ASSEMBLY

[75] Inventors: Donald C. Ulrich, Collinsville; Roger Krause, Vandalia, both of Ill.

[73] Assignee: John Crane Inc., Morton Grove, Ill.

[21] Appl. No.: 276,125

[22] Filed: Nov. 25, 1988

[51] Int. Cl.[5] .................. B65D 53/00; F02F 5/00; F16J 9/06
[52] U.S. Cl. .................. 277/35; 277/47; 277/48; 277/152; 277/184
[58] Field of Search .............. 277/35, 52, 152, 153, 277/235 R, 47, 48, 49, 184

[56] References Cited

U.S. PATENT DOCUMENTS

| | | | |
|---|---|---|---|
| 3,275,331 | 9/1966 | Mastrobattista et al. | 277/152 X |
| 3,549,445 | 12/1970 | McMahn | 277/35 X |
| 3,938,813 | 2/1976 | Forch | 277/152 |
| 4,119,324 | 10/1978 | Denton et al. | 277/152 X |
| 4,159,298 | 6/1979 | Bainard | 277/153 X |
| 4,664,392 | 5/1987 | Hatch | 277/152 |
| 4,721,314 | 1/1988 | Kanayama et al. | 277/152 |

Primary Examiner—Allan N. Shoap
Assistant Examiner—Scott W. Cummings
Attorney, Agent, or Firm—Kinzer, Plyer, Dorn, McEachran & Jambor

[57] ABSTRACT

A multi-layer radial lip seal assembly adapted to be retained to the housing of an automotive air conditioning compressor and to be disposed about a rotatable shaft extending through a chamber provided in the housing. The lip seal assembly includes a first seal member or disc of virgin FEP adjacent to a second seal member or disc of graphite-filled PTFE. A retainer is provided to support the first and second seal members and an elastomer is molded to the retainer and seals the seal members to the retainer. The first seal member acts to protect the second seal member during installation and quickly wears away, so that the second seal member becomes the primary seal member.

14 Claims, 2 Drawing Sheets

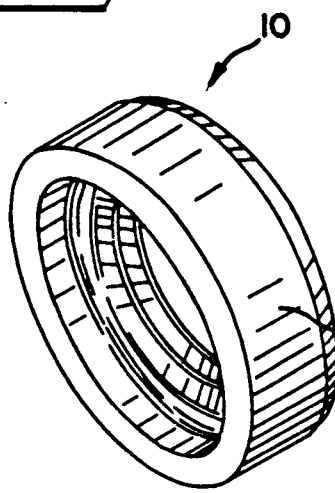
FIG_1_
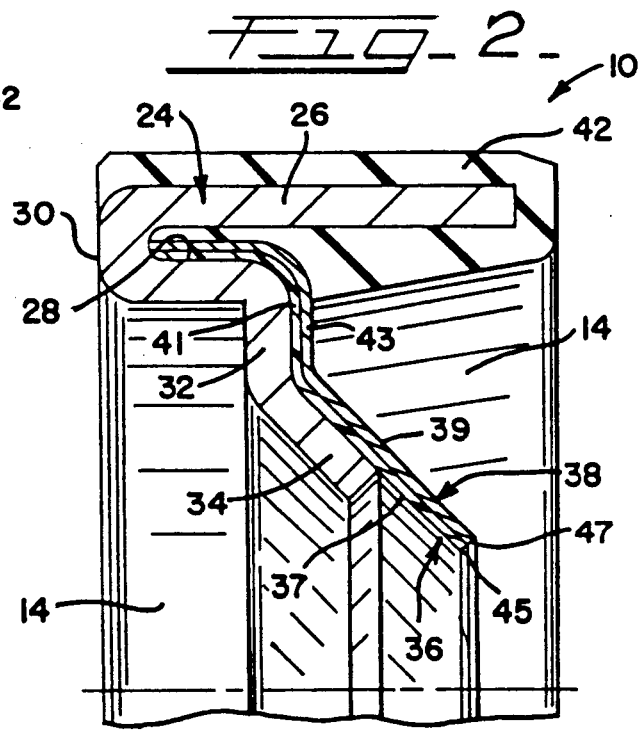
FIG_2_
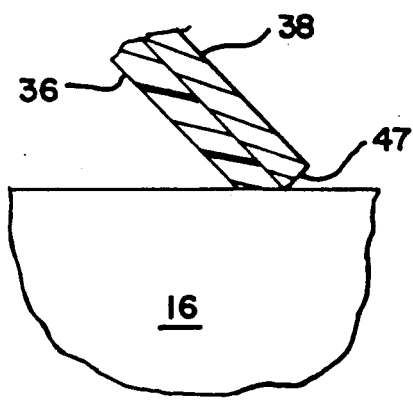
FIG_5_
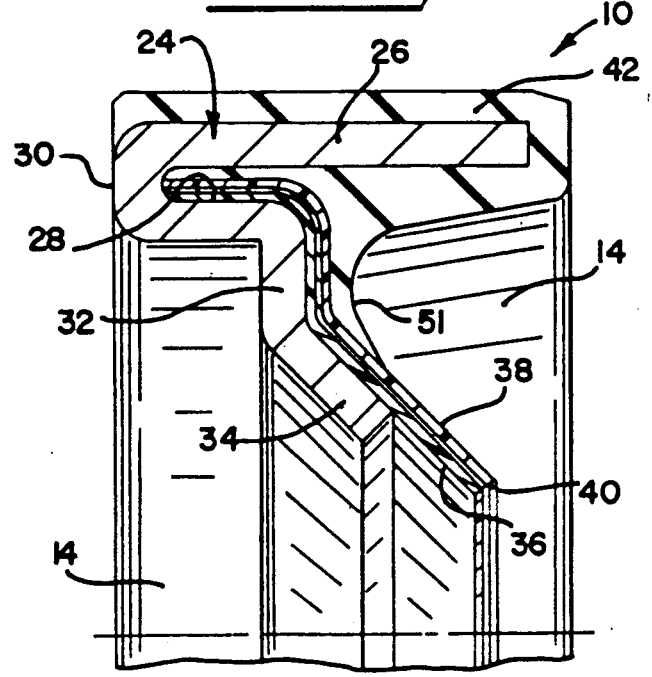
FIG_6_

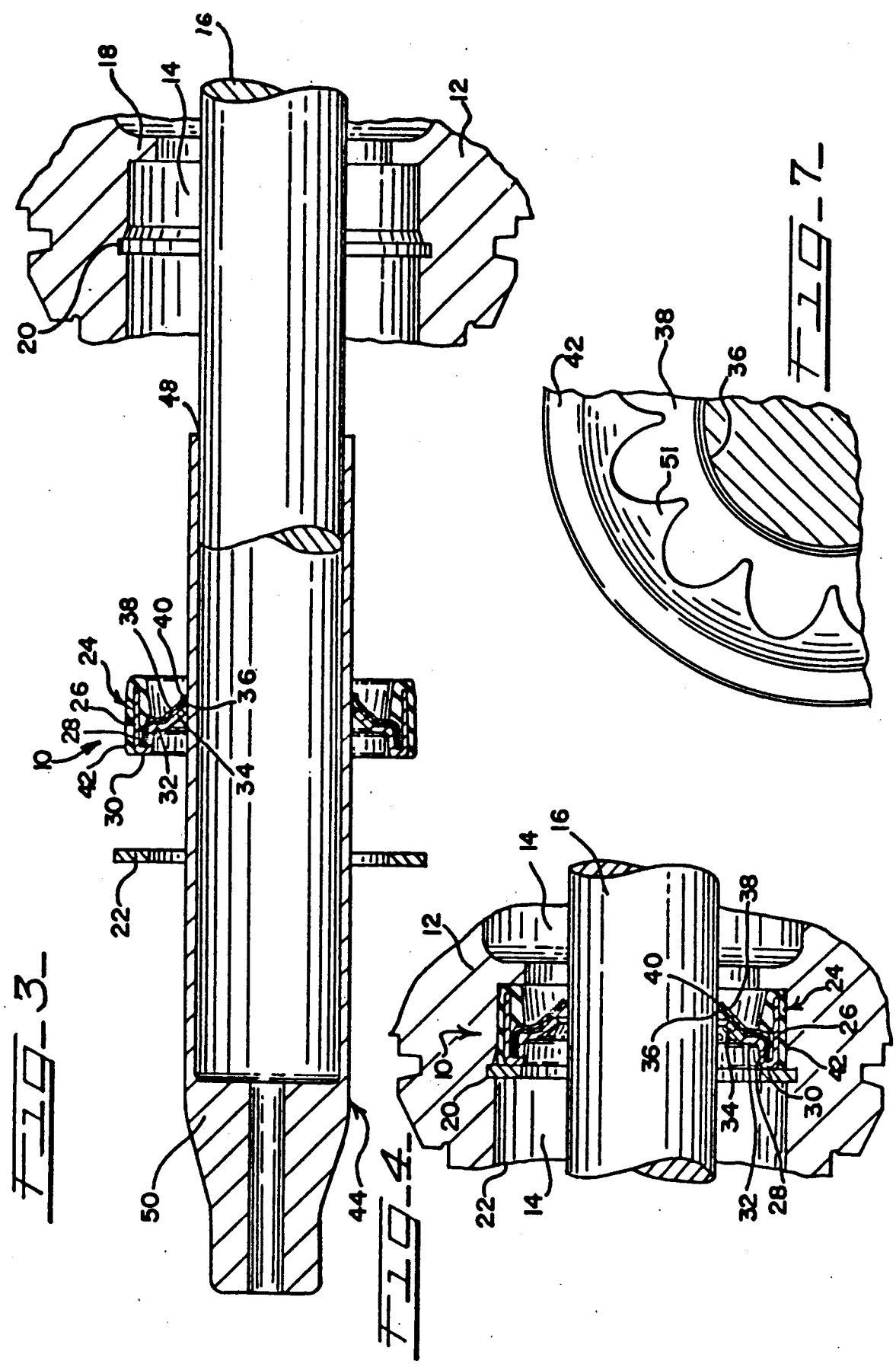

MULTI-LAYER LIP SEAL ASSEMBLY

BACKGROUND OF THE INVENTION

The present invention is directed to an annular multi-layer radial lip seal assembly. More particularly, it is directed to such a lip seal assembly which includes a molded elastomeric portion which provides the static or secondary seal. Numerous prior art patents disclose lip seal assemblies, including lip seal assemblies having a molded elastomeric portion. These include U.S. Pat. Nos. 602,746, 1,941,025, 3,549,445, 3,801,114, 3,938,813, 4,042,248, 4,171,561, 4,194,748, 4,504,068, 4,583,749, 4,591,168, 4,623,153, 4,650,196 and 4,664,392. None of the foregoing patents disclose the features of the present invention.

SUMMARY OF THE INVENTION

The present invention provides a molded multi-layer radial lip seal assembly adapted for use in automotive air conditioning compressors and the like. The seal assembly is adapted to be retained to the housing of the compressor and to be disposed about and in contact with a rotatable shaft extending through a chamber provided in the housing. The seal assembly includes an annular metal retainer designed to support first and second seal members in the form of polymer discs. The first seal member is made of virgin fluorinated ethylene propylene and is positioned adjacent to and in contact with the metal retainer. The second seal member is made of graphite-filled polytetraflouroethylene and is sandwiched together with the first seal member, such that at installation, the first seal member contacts the surface of the shaft and protects the second member. The first disc has a higher wear rate than the second and wears rapidly in use until the second disc contacts the shaft. Long term sealing is provided by the sealing contact of the second disc with the shaft. An elastomer is molded to the metal retainer and around the first and second seals. The molded elastomer provides the secondary seal between the assembly and housing and between the discs and retainer.

In an alternative form, a metallized plastic film may be disposed between the first and second seal members to provide a further barrier to gas leakage.

BRIEF DESCRIPTION OF THE DRAWINGS

FIG. 1 shows a perspective view of the seal assembly of the present invention.

FIG. 2 shows a side sectional view of the seal assembly of the present invention.

FIG. 3 shows the seal assembly positioned about the installation tool and the installation of the seal assembly onto the shaft.

FIG. 4 shows a side sectional view of the seal assembly installed within an air conditioning compressor.

FIG. 5 is a fragmentary view on an enlarged scale showing the lip seals in contact with the shaft.

FIG. 6 shows a side sectional view of an alternate embodiment of the seal assembly of the present invention.

FIG. 7 is a fragmentary plan view of the seal of FIG. 6.

DETAILED DESCRIPTION OF THE INVENTION

A multi-layer radial lip seal assembly generally designated by the numeral 10, is shown in FIGS. 1-5. In the illustrated embodiment, the seal assembly 10 is adapted to be retained to the housing 12 of an automotive air conditioning compressor to seal freon gas. It is contemplated, however, that the seal 10 would be suitable for other pump, motor or compressor or similar applications sealing either gas or fluid.

A substantially cylindrical chamber 14 is provided within the housing 12 and a rotatable shaft 16 extends therethrough. An inwardly extending flange 18 depends from the housing 12 into the chamber 14. A groove 20, extending peripherally about the chamber 14, is formed in the housing 12 to the left of the flange 18, when viewing FIG. 4. A snap ring 22 is fit into the groove 20. The seal assembly 10 is adapted to be retained to the housing 12 between the flange 18 and the snap ring 22.

As seen in FIG. 2, the seal assembly 10 includes a substantially cylindrical metal retainer 24 having an outer wall 26, an inner wall 28 spaced beneath and parallel to the outer wall 26, a side wall 30 joining the inner wall 28 and outer wall 26 and a support wall 32 depending inwardly from the inner wall 28 and defining a support flange 34. The retainer 24 is made of steel.

The seal lips are defined by first and second seal members or discs 36 and 38, respectively, disposed in side-by-side relation. First seal member 36 is positioned adjacent to and in contact with the retainer 24, such that it is supported by the support wall 32 and the support flange 34. The first seal member 36 is made of virgin fluorinated ethylene propylene (FEP) which has a relatively high wear rate. Positioned adjacent to and in contact with the first seal member 36 is a second seal member 38 made of graphite-filled polytetrafluoroethylene (PTFE), which has a relatively low wear rate. The first seal member 36 supports the second seal member 38. Discs 36 and 38 are annular and are formed to include conical portions 37 and 39 and radial portions 41 and 43, respectively. The inner diameter of the apertures 45 and 47 of the disc 36 and 38, respectively, are smaller than the diameter of the shaft 16 against which these members 36, 38 seal. These discs 36, 37 may be heat set or cold formed into the truncated configuration illustrated.

The discs 36 and 38 are disposed in the assembly 10 such that the conical configuration extends from radial portions 41 and 43 in a direction toward the pressure to be sealed. Thus, the sealed gas or fluid within the housing urges the first disc 36 against flange 34 of retainer 24 and the inner diameter toward the rotating shaft 16. Flange 34 provides support for the seal members 36 and 38 against the pressure in the housing 12. Also, the discs 36 and 38 are arranged such that the first disc 36 is positioned to protect the second disc 38 during installation of the seal assembly 10 and initial running of the seal 10.

An elastomer 42 such as nitrile rubber is molded onto the retainer 24 and around the outer peripheries of the radial portions 41 and 43 of the FEP and filled-PTFE seal members 36 and 38, respectively. As best seen in FIG. 2, the elastomer 42 encapsulates the outer wall 26 of the retainer 24 and fills the space between the outer wall 26 and the inner wall 28 of the retainer 24. The seal members 36 and 38 are captured in the elastomer 42. In molding, the outer peripheries of radial portions 41 and 43 of disc 36 and 38, respectively, are forced against wall 32 of flange 34 of retainer 24. These portions 41 and 43 of the discs 36 and 38, respectively, are urged into sealing contact with wall 32 and flange 34 to prevent leakage of gas around the outer ends of the discs 36 and 38. To achieve this relationship upon molding, it has been determined that the outer diameter of the discs 36 and 38 should be approximately equal to the inner diameter of wall 26. During molding, the elastomer 42 urges the radial portions 41 and 43 to the position illustrated in FIG. 2, against the portions 28 and 26 of the retainer 24. The elastomer 42 provides a gas tight seal against the retainer 24 and the discs 36 and 38.

An installation tool 44, as seen in FIG. 3, is used to install the seal assembly 10 about the shaft 16 and to the housing 12 of the compressor. The installation tool 44 is a substantially cylindrical, hollow tube having an open end 48 sized to be received about the shaft 16. One end of the tool 44 is provided with a substantially conical-shaped bullet 50. The seal assembly 10 is slid over the end of the bullet 50 and about the tube portion of the tool 44. The outer surface of the tool 44 is highly polished so that the seal 10 glides relatively easily onto the tool 44. The installation tool 44 is then slid over the shaft 16, open end 48 first. The seal assembly 10 is positioned into abutment with the flange 18 extending from the housing 12 of the compressor and the snap ring 22 is fit into the groove 20, thereby securing the seal assembly 10 with respect to the housing 12. The outer periphery 43 of the molded elastomer 42 provides a gas tight seal against the housing 12. The installation tool 44 is then pulled out in the opposite direction that it was installed, to disengage itself from the seal assembly 10 so that the inner periphery of the FEP seal member 36 contacts the surface of the shaft 16.

The discs 36 and 38 are such that at installation, the inner periphery of the first seal member 36 contacts the surface of the shaft 16, but the inner periphery of the second seal member 38 does not contact the surface of the shaft 16. Because the inner periphery of the FEP seal member 36 extends beyond the inner periphery of the filled-PTFE seal member 38, it is interposed between the shaft 16 and the filled-PTFE seal member 38 during installation and initial wear-in. Any nicks, dents or other damage during installation, which would cause a leakage path, are in the FEP seal member 36, not the member 38. As best seen in FIG. 5, nicks or dents in the FEP seal member are quickly worn away during dynamic break-in of the compressor and member 38 provides long term sealing contact with shaft 16. By comparison, a nick in the lip of the graphite-filled PTFE seal member 38 would require extensive break-in to wear away.

Sealing is accomplished as follows. The elastomer 42 acts to seal off secondary leakage paths between the retainer 24 and the housing 12 and between the FEP and filled-PTFE seal members 36 and 38 and the metal retainer 24. When the shaft 16 rotates, it rapidly wears the FEP seal member 36, which has a high wear rate under dynamic shaft rotation, to wear away any nicks or dents therein, as described above. This rapid wearing away yields optimum shaft contact and minimizes gas leakage during the initial break-in period of the compressor. The FEP seal member 36 acts as the initial seal member. In addition, as the FEP seal member 36 wears away, it is thought that it deposits a lubricating film to the shaft 16. As shown in FIG. 5, as the FEP seal member 36 wears away, the filled-PTFE seal member 38, which has a lower wear rate, contacts the surface of the shaft 16 and becomes the long-life, primary seal element. It is filled with graphite, and, thus, possesses self lubricating properties. Although the FEP seal member 36 no longer contacts the shaft 16, it performs as a back-up support for the filled-PTFE seal member 38 to prevent extrusion thereof under high system pressure.

In the embodiment of FIG. 6, a metallized polymer film 40 is disposed between the FEP seal member 36 and the filled-PTFE seal member 38. It reduces gas permeability through the matrix of the FEP and filled-PTFE seal members 36 and 38. The film 40 may be selected from any suitable material including nylon, polymide, or mylar. The deposited metal may be aluminum.

Also, as illustrated in FIGS. 6 and 7, the molded elastomer 42 includes a plurality of radial fingers 51 which overlies second sealing member 38. These fingers act to strengthen the discs 36 and 38 against the pressure of the sealed gas.

Various features of the invention have been particularly shown and described in connection with the illustrated embodiment of the invention, however, it must be understood that these particular arrangements merely illustrate and that the invention is to be given its fullest interpretation within the terms of the appended claims.

What is claimed is:

1. A radial lip seal assembly adapted to be retained in a housing to seal a rotatable shaft extending through an opening therein, said seal assembly comprising:
   a) an annular retainer;
   b) first and second annular sealing members disposed in side-by-side relation and having inner diameters smaller than the diameter of the shaft to be sealed, wherein said first sealing member is made of fluorinated ethylene propylene (FEP) and said second member is made of polytretrafluoroethylene (PTFE); and
   c) means sealing said first and second sealing member to said retainer, wherein said first sealing member is disposed relative to said second sealing member for direct contact with the rotatable shaft.

2. A radial lip seal assembly as claimed in claim 1 wherein said means sealing said first and second sealing members to said retainer is a molded elastomer and further is adapted to seal said retainer to the housing.

3. A radial lip seal assembly as claimed in claim 2 wherein said retainer includes an axial wall and a radial wall, and said elastomer urges said first sealing member into sealing contact with said axial wall and said radial wall and said means seals against said second sealing member.

4. A radial lip seal assembly as claimed in claim 3 wherein said retainer axial wall further comprises an outer axial portion integrally connected to an inner axial portion, said retainer radial wall further comprises an inwardly-extending, conical flange integrally connected to said inner axial portion, and said first and second annular sealing members are formed to include generally radial outer portions and truncated conical inner portions, the outer diameter of said radial outer portions of said sealing members being approximately equal to the inner diameter of said outer axial portion of said retainer axial wall and wherein said molded elastomer forces said sealing member radial outer portions to overlie said radial wall and said flange of said retainer.

5. A radial lip seal assembly as claimed in claim 4 wherein said truncated portions of said first and second seal members overlie said conical flange of said retainer.

6. A radial lip seal assembly as claimed in claim 1 wherein said first and second annular members are arranged such that on installation, only said inner diameter of said first sealing member contacts said shaft and a portion of said first sealing member is disposed intermediate said second sealing member and the shaft.

7. A radial lip seal assembly as claimed in claim 2 wherein said first and second annular members are arranged such that on installation, only said inner diameter of said first sealing member contacts said shaft and a portion of said first sealing member is disposed intermediate said second sealing member and the shaft.

8. A radial lip seal assembly as claimed in claim 3 wherein said first and second annular members are arranged such that on installation, only said inner diameter of said first sealing member contacts said shaft and a portion of said first sealing member is disposed intermediate said second sealing member and the shaft.

9. A radial lip seal assembly as claimed in claim 4 wherein said first and second annular members are arranged such that on installation, only said inner diameter of said first sealing member contacts said shaft and a portion of said first sealing member is disposed intermediate said second sealing member and the shaft.

10. A radial lip seal assembly as claimed in claim 5 wherein said first and second annular members are arranged such that on installation, only said inner diameter of said first sealing member contacts said shaft and a portion of said first sealing member is disposed intermediate said second sealing member and the shaft.

11. A radial lip seal assembly as claimed in claim 2 wherein said elastomer defines a plurality of radially directed fingers overlying said second sealing member on the side thereof opposite said first sealing member.

12. A radial lip seal assembly as claimed in claim 2 wherein a layer of metalized plastic is disposed intermediate said first and second sealing members.

13. A radial lip seal assembly as claimed in claim 12 wherein said layer of metalized plastic is sized to coincide with said first and second sealing members.

14. A radial lip seal assembly as claimed in claim 13 wherein said layer of metalized plastic has a metalized layer facing said second sealing member.

* * * * *